United States Patent Office 2,970,175
Patented Jan. 31, 1961

2,970,175

PREPARATION OF POLYHALOMETHANOINDANS

Louis Schmerling, Riverside, Ill., assignor to Universal Oil Products Company, Des Plaines, Ill., a corporation of Delaware No Drawing. Filed May 20, 1959, Ser. No. 814,411

9 Claims. (Cl. 260—648)

This application is a continuation-in-part of my copending application Serial No. 536,729, filed September 26, 1955, now abandoned.

This invention relates to a process for preparing novel compositions of matter, and particularly to a process for the preparation of polyhalotetrahydromethanoindans. More particularly, the invention is concerned with a process for the preparation of 1,3,4,5,6,7,8,8-octachloro-3a,4,7,7a-tetrahydro-4,7-methanoindan.

Heretofore, there has been no indication that a cycloalkene could be condensed in a Diels-Alder manner with a polyhalocycloalkadiene. It has been well known that a polyhalocycloalkadiene could be condensed with a conjugated cycloalkadiene since the dienophile in the Diels-Alder reaction is usually (as originally propounded) a compound which contains an ethylenic double bond conjugated with another unsaturated bond such as an ethylenic bond, a carbonyl or a nitrile, such compounds reacting very readily. However, as hereinbefore set forth, it was not known that a cycloalkene or a halogenated cycloalkene, and particularly a polyhalo substituted cycloalkene would undergo a Diels-Alder condensation with a polyhalocycloalkadiene. The prior art as shown in United States Patent No. 2,724,730 does disclose a catalytic reaction of hexachlorocyclopentadiene with hexachlorocyclopentadiene, cyclopentadiene, cyclopentene, etc. However, the reaction is not a Diels-Alder reaction nor are the products Diels-Alder products. If, for example, hexachlorocyclopentadiene is reacted with itself in the presence of a catalyst such as aluminum chloride the resultant product is a dimer which sublimes above 240° C. and melts at 485° C. in a sealed tube. This compound (a hexacyclic compound) is definitely not the Diels-Alder dimer (a tricyclic compound) which would have been formed if hexachlorocyclopentadiene could be reacted with itself in a Diels-Alder thermal reaction. The tricyclic compound has been prepared by an alternate involved reaction including dechlorination-condensation in the presence of cuprous chloride followed by chlorination in a second step; it melts at 221–223° C. and yields hexachlorocyclopentadiene on pyrolysis (i.e., the reverse of the Diels-Alder reaction). It has been shown in the Journal of the American Chemical Society (vol. 77, page 4377 (1955)) that the forward reaction does not occur inasmuch as the compound cannot be prepared from hexachlorocyclopentadiene directly, even hexachlorocyclopentadiene (a conjugated diene) being unable to act as a dienophile. It is obvious that the condensations disclosed in the hereinbefore mentioned patent are catalytic reactions and not thermal Diels-Alder reactions.

It has now been unexpectedly discovered that a polyhalo substituted cycloalkene and particularly a dichlorocyclopentene will undergo a thermal Diels-Alder condensation with hexachlorocyclopentadiene in the absence of any catalytic material. This condensation is surprising inasmuch as it is unexpected that a cycloalkene such as cyclopentene will react with hexachlorocyclopentadiene, and it is even more unexpected that a dichlorocyclopentene will condense with hexachlorocyclopentadiene. The latter condensation is totally unexpected inasmuch as the introduction of halogen substituents into the alkene molecule appears to decrease its reactivity with the hexachlorocyclopentadiene. This is illustrated by the fact that better yields of an adduct can be obtained when condensing an alkene such as ethylene with hexachlorocyclopentadiene than with the chlorinated ethylenes such as vinyl chloride and 1,2-dichloroethylene, and no adduct at all is obtained when using trichloroethylene.

One of the compounds obtained by the condensation of 3,5-dichlorocyclopentene (a 3,5-dihalocycloalkene) and hexachlorocyclopentadiene (a polyhalocyclopentadiene), namely, 1,3,4,5,6,7,8,8-octachloro-3a,4,7,7a-tetrahydro-4,7-methanoindan, is an effective insecticide. The process of preparing this compound differs from that found in the prior art which discloses a process for obtaining a compound which is a structural isomer of the present compound. For example, a compound possessing limited insecticidal properties, namely, the so-called α-isomer of 1,2,4,5,6,7,8,8-octachloro-3a,4,7,7a-tetrahydro-4,7-methanoindan is prepared by condensing hexachlorocyclopentadiene and cyclopentadiene followed by chlorination of the resultant compound to form the desired product. A stereo isomer of this latter compound may be prepared by the same two steps, but involves carrying out the chlorination step in total darkness and in a benzene solvent, this stereo isomer, known as β-1,2,4,5,6,7,8,8 - octachloro - 3a,4,7,7a - tetrahydro - 4,7 - methanoindan, possesses more potent insecticidal properties than the α-isomer. However, as hereinbefore set forth, the compound of the present invention, namely, 1,3,4,5,6,7,8,8 - octachloro - 3a,4,7,7a - tetrahydro - 4,7 - methanoindan is prepared by first chlorinating cyclopentadiene and condensing the resultant 3,5-dichlorocyclopentene (a compound which does not possess a pair of conjugated double bonds) with hexachlorocyclopentadiene, the latter step being completely novel and unexpected, to produce a structural isomer of the aforesaid compounds of the prior art, the compound of the present invention exhibiting unexpectedly superior insecticidal activity over the α-isomer of the prior art.

It is therefore an object of this invention to prepare novel compositions of matter which may be used as insecticides.

A further object of this invention is to prepare polyhalotetrahydromethanoindans in which the halogen atoms in the five membered ring are not on adjacent carbon atoms, said preparation being accomplished by a novel process which comprises condensing a polyhalocycloalkene with a polyhalocycloalkadiene.

One embodiment of this invention resides in a process for the preparation of a polyhalo substituted tetrahydromethanoindan which comprises contacting a halogen with a cyclopentadiene and further condensing the resultant dihalocycloalkene with a polyhalocycloalkadiene to form a polyhalo substituted tetrahydromethanoindan.

A further embodiment of the invention resides in a process for the preparation of a polychloro substituted tetrahydromethanoindan which comprises contacting chlorine with cyclopentadiene and further condensing the resultant 3,5-dichlorocyclopentene with a hexachlorocyclopentadiene at a temperature in the range of from about 50° to about 250° C. to form a polychlorotetrahydromenthanoindan.

A specific embodiment of the invention resides in a process for the preparation of 1,3,4,5,6,7,8,8-octachloro-3a,4,7,7a-tetrahydro-4,7-methanoindan which comprises contacting chlorine with liquid cyclopentadiene to form 3,5-dichlorocyclopentene and further condensing equimolecular portions of said 3,5-dichlorocyclopentene and hexachlorocyclopentadiene in a Diels-Alder manner at a temperature in the range of from about 100° to about 200° C. to form 1,3,4,5,6,7,8,8-octachloro-3a,4,7,7a-tetrahydro-4,7-methanoindan.

Other objects and embodiments referring to alternative polyhalocycloalkadienes and polyhalocycloalkenes will be found in the following further detailed description of the invention.

As hereinbefore set forth it has now been discovered that a polyhalotetrahydromethanoindan in which the two halogen atoms on the five membered ring are not on adjacent carbon atoms, but are on alternate carbon atoms may be prepared by condensing at elevated temperatures, a polyhalocyclopentadiene and a 3,5-dihalocyclopentene, the preferred halogens having an atomic weight of between 35 and 80 (i.e. chlorine and bromine). For example, when hexachlorocyclopentadiene is condensed with 3,5-dichlorocyclopentene at an elevated temperature, the reaction product comprises 1,3,4,5,6,7,8,8-octachloro-3a,-4,7,7a-tetrahydro-4,7-methanoindan (Compound I) which is a position isomer of another insecticide 1,2,4,5,6,7,8,8-octachloro-3a,4,7,7a-tetrahydro-4,7-methanoindan having the commercial name Chlordane (Compound II).

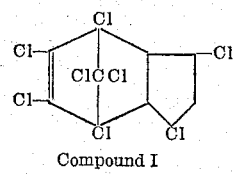  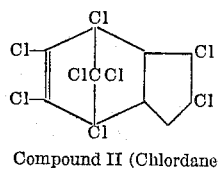

Compound I         Compound II (Chlordane)

It has been found that the compound of the present invention experiences an unexpected superiority as an insecticide over Chlordane, as illustrated when using the Mexican bean beetle larvae as a test insect. This effectiveness is shown in Table I below. The test consisted of spraying leaves with an 0.1% solution of Compound I and a similar solution of Chlordane, the solutions being prepared by mixing 1.5 g. of the compound with 1.5 g. of benzene and 1.5 g. of Triton X-100 and adding 1500 ml. of water. At the end of 48 hours the percentage of dead larvae was determined and the amount of leaf consumed was recorded.

TABLE I

| Compound | Mexican bean beetle larvae dead after 48 hours, percent |
|---|---|
| 1,3,4,5,6,7,8,8-Octachloro-3a,4,7,7a-tetrahydro-4,7-methanoindan (Compound I, product of Example II) | 100 |
| Chlordane (Compound II) | 0 |

The leaf which was sprayed with the solution of Chlordane was totally consumed, no dead larvae being found. That sprayed with the solution of Compound I was largely unaffected and all the larvae were dead.

Another advantage of the compound of the present invention over the aforementioned isomer is that dehydrochlorination of the present compound yields a compound known as Heptachlor which is a more active insecticide than Chlordane toward certain insects.

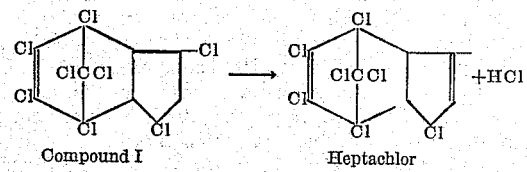

Compound I           Heptachlor

Dehydrochlorination of Chlordane results in a product which exhibits no toxicity towards insects.

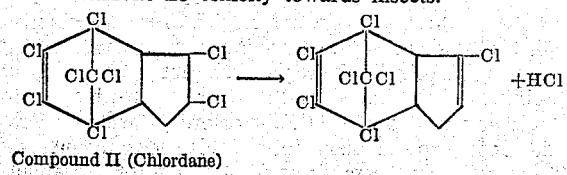

Compound II (Chlordane)

Therefore, the compounds of the present invention, under hydrolytic conditions (when stored in formulations for any length of time) will not lose activity as does the isomer Chlordane.

In addition to exhibiting marked activity, in weak dilutions, toward the Mexican bean beetle larvae, the compound of the present invention has also been found to be effective against houseflies, southern army worms, pea aphids, red spider mites, and spotted mites. When used as a spray insecticide, solutions were prepared using 1.5 g. or 0.15 g. of the insecticide in 150 ml. of water containing 1.5 g. or 0.15 g., respectively of Triton X-100. When used as a poison bait test a 50 ml. bait containing 5% sugar and 0.1% of the insecticide was placed in a Petri dish which was then placed in a stainless steel round cage containing 50 adult houseflies. The effectiveness of the present compound against the aforementioned insects is shown in Table II below:

| | Houseflies Spray | | Southern Army Worm | | Pea Aphid | | Red Spider Mite | | Houseflies (poison bait) |
|---|---|---|---|---|---|---|---|---|---|
| Time | 24 hours | | 48 hours | | 48 hours | | 5 days | | 24 hours |
| Dilution, percent | 1 | 0.1 | 1 | 0.1 | 1 | 0.1 | 0.5 | 0.1 | 0.1 |
| Percent Dead | 100 | 100 | 100 | 100 | a 100 | a 100 | b 100 | 11 | 100 | a No nymphal colonies present.
b No hatching eggs.

Therefore, as hereinbefore set forth, it is certainly unexpected that the use of the same starting materials (cyclopentadiene, chlorine and hexachlorocyclopentadiene) yields a far superior insecticide when they are used in first a chlorination step followed by a Diels-Alder condensation step rather than when the reactants are used in first a Diels-Alder step followed by chlorination as in preparation of Chlordane.

Polyhalocyclopentadienes which may be used in the process of this invention include dichlorocyclopentadienes, trichlorocyclopentadienes, tetrachlorocyclopentadienes, pentachlorocyclopentadienes, hexachlorocyclopentadiene, dibromocyclopentadienes, tribromocyclopentadienes, tetrabromocyclopentadienes, pentabromocyclopentadienes, hexabromocyclopentadiene, etc. It is also contemplated within the scope of this invention that mixed halocyclopentadienes such as trichlorobromocyclopentadienes, tetrachlorodibromocyclopentadienes, etc., may be used although not necessarily with equivalent results.

The polyhalocyclopentadiene is condensed in a Diels-Alder thermal reaction with a 3,5-dihalocyclopentene which may be prepared by halogenating a 1,3-cyclopentadiene (also referred to as a cyclopentadiene) in the liquid phase with an excess of a halogen such as chlorine or bromine at low temperatures in the range of from about −50° to about +50° C., yielding a 3,5-dichlorocyclopentene or a 3,5-dibromocyclopentene, respectively, the preferred 3,5-dihalocyclopentenes of this invention. Other cyclopentadienes which may be used in the process of this invention include methylcyclopentadiene, ethylcyclopentadiene, dimethylcyclopentadienes, diethylcyclopentadienes, etc., although not necessarily with equivalent results. It is also contemplated within the scope of this invention that the aforementioned halogenation of the cyclopentadiene may take place at higher temperatures in the gaseous phase, if so desired.

The condensation step of the present invention may be effected in any suitable manner and may comprise either a batch or a continuous type operation. For example, when a batch type operation is used, a quantity of the starting materials comprising the dihalocyclopentene and a polyhalocyclopentadiene in equimolecular proportions of reactants is placed in an appropriate condensation apparatus such as an alkylating flask, a rotating autoclave, etc. The reaction mixture is then heated to a temperature in the range of from about 50° to about 250° C. and preferably in a range of from about 100° to about 200° C. and maintained thereat for a predetermined residence time ranging from about 0.5 to about 10 hours or more. At the end of this time the flask and contents thereof are cooled to room temperature and the desired condensation product comprising a polyhalotetrahydromethanoindan is separated by fractional distillation under reduced pressure or by any other conventional means available. If so desired, the reaction may take place in the presence of an inert diluent such as benzene, toluene, etc.

Another method by which the present process may be completed comprises a continuous type operation. In this operation the starting materials comprising the dihalocyclopentene and the polyhalocyclopentadiene are continuously charged to a reactor maintained at the desired conditions of temperature and pressure. The reactor may comprise an unlined vessel or coil or may be lined with an adsorbent packing material such as fire brick, alumina, dehydrated bauxite and the like. The starting materials may be continuously charged through separate lines or, if so desired, may be admixed prior to introduction and continuously charged in a single stream. After a predetermined residence time has been completed the reaction mixture is continuously withdrawn, the desired reaction product separated from the unreacted starting materials by fractional distillation under reduced pressure, the latter materials being recycled to form a portion of the feed stock.

The physical properties of the present Diels-Alder adducts of the polyhalocyclopentadiene and the 3,5-dihalocyclopentene, and the effects they have on entomological forms of life make them particularly desirable as insecticides and insect repellents, the particular compounds having many of the features desired of materials for this purpose. They are, for example, toxic to insects which are destructive of plant life and materials normally subject to insect infestation, their toxic effects being manifested by contact of the poison with the insect. The insecticides comprising the present compounds are thus effective against chewing as well as sucking types of insects. The compounds are sufficiently volatile so that when applied to plant life intended for subsequent human consumption the plants, when harvested and after allowing a reasonable time for evaporation of the applied insecticide therefrom retain none of the toxicant to prevent use of the plant for consumption as food. On the other hand, the compounds are of sufficiently limited volatility to be retained for the time required to accomplish the toxic effects of the compounds on the insects. The volatility and retentive capacity of the compounds may be varied at will by combining them with suitable fixing agents which reduce or promote their volatilization, as desired. Thus, the compounds may be dissolved in a suitable high boiling solvent such as a mineral oil, petroleum, etc.; a wax, such as paraffin wax, beeswax, etc.; a high molecular weight alcohol or ether such as myricyl alcohol, dibutyl ether, etc.; or they may be emulsified with water or combined with an oil and emulsified with water by the addition of an emulsifying agent such as a surface active agent to the mixture of components. The latter solvents and dispersants may also be employed for the specific purpose of reducing the concentration of insecticide to the desired level in a specific insecticidal formulation. The particular formulation of active components in combination with the solvent or dispersant will depend upon its application. Compositions containing as high as 20% of active component may be preferred in some instances where deep penetration of the insecticide is desired, as in the treatment of fibrous material such as wood for extinction of a particular infestation, for example, wood termites. For other purposes, the required concentration of active component in the formulation may be even lower than 0.1% as, for example, in the treatment of fabrics for destroying moth larvae.

In utilizing the present insecticidal compounds against most insects, a composition containing from about 0.1 to about 5% by weight of active component is highly effective. Even lower concentrations are effective in many cases. The choice of the most desirable solvent or dispersant further depends upon the method utilized to apply the insecticidal composition to the infested article. For example, a low molecular weight, normally gaseous carrying agent for the active insecticide composition, such as propane, butane, the Freons, etc., may be compressed and liquefied into a small bomb containing the insecticide. Upon release of pressure from the bomb, the insecticide and liquefied carrier are sprayed on the surface to be protected, the liquefied carrier vaporizes, and a quantity of the active component is suspended on the surface; thus, a convenient spraying method for applying the insecticide is provided. The active component may also be dissolved in a liquid carrier such as kerosene, an alcohol, ester, ketone, etc., and the resulting solution atomized by a suitable spraying device.

The present invention is further illustrated with respect to specific embodiments thereof in the following examples, which, however, are not intended to limit the generally broad scope of the present invention in strict accordance therewith.

*Example I*

One hundred grams (1.5 moles) of freshly distilled cyclopentadiene was placed in a condensation flask, the temperature of said flask being lowered to −30° to −33° C. by the use of a Dry Ice-acetone bath. Approximately 72 g. (1.0 mole) of chlorine was bubbled into said cyclopentadiene with stirring during a period of approximately 1.25 hours, after which the stirring was continued for an additional 0.25 hour. At the end of this time the product was taken up in pentane, washed, dried and distilled from anhydrous potassium carbonate.

One mole of the 3,5-dichlorocyclopentene which was recovered from the fractional distillation under reduced pressure of the reaction mixture described in the above paragraph was heated in a flask with 1 mole of hexachlorocyclopentadiene in the presence of toluene at a temperature of from 128–130° C. for a period of 8 hours. At the end of this time the flask was cooled to room temperature and the reaction product was washed, dried and subjected to fractional distillation under reduced pressure. A cut boiling at 160–161° C. at 2.0 mm. pressure (corresponding to 353–355° C. at 760 mm. as determined by the Lippincott nomograph) comprising 1,3,4,5,6,7,8,8-octachloro-3a,4,7,7a-tetrahydro-4,7-methanoindan, was obtained. Its refractive index, $n_D^{20}$, was 1.5750.

*Example II*

3,5-dichlorocyclopentene was obtained in a manner similar to that set forth in the first paragraph of the above experiment. One mole of 3,5-dichlorocyclopentene was heated with 1 mole of hexachlorocyclopentadiene at a temperature of 150–155° C. for a period of approximately 6 hours in the absence of any inert diluent or solvent. At the end of this time the flask was cooled to room temperature and the reaction product subjected to fractional distillation under reduced pressure. A cut boiling at 140–150° C. at 1.0 mm. pressure (corresponding to 348–360° C. at 760 mm.) comprising 1,3,4,5,6,7,8,8-octachloro-3a,4,7,7a-tetrahydro-4,7-methanoindan, was obtained. Its refractive index, $n_D^{20}$, was 1.5750.

*Example III*

In this example 100 g. (1.5 mole) of freshly distilled cyclopentadiene is placed in an apparatus similar to that set forth in Example I above, the temperature of said apparatus being lowered to approximately −35° C. by using a Dry Ice-acetone bath. Approximately 160 g. (1.0 mole) of bromine is added to said cyclopentadiene while continuously stirring said mixture, said addition taking place during a period of approximately 1.5 hours. The stirring is continued for an additional 0.5 hour, at the end of which time the product is taken up in pentane, washed, dried and distilled from anhydrous potassium carbonate.

The 3,5-dibromocyclopentene which is separated and recovered during the fractional distillation under reduced pressure is heated in a flask with hexabromocyclopentadiene in a 1:1 mole ratio in the presence of toluene at a temperature of from about 128–130° C. for a period of about 8 hours. At the end of this time the flask is cooled to room temperature and the reaction product is washed, dried and subjected to fractional distillation under reduced pressure. The cut comprising 1,3,4,5,6,7,8,8-octabromo-3a,4,7,7a-tetrahydro-4,7-methanoindan is separated and recovered.

I claim as my invention:

1. A process for the preparation of a polyhalo substituted tetrahydromethanoindan which comprises contacting a halogen with a cyclopentadiene and subjecting the resultant dihalocyclopentene to a non-catalytic Diels-Alder condensation with a polyhalocycloalkadiene to form a polyhalo substituted tetrahydromethanoindan.

2. A process for the preparation of a polyhalo substituted tetrahydromethanoindan which comprises contacting a halogen with cyclopentadiene and subjecting the resultant 3,5-dihalocyclopentene to a non-catalytic Diels-Alder condensation with a polyhalocyclopentadiene at a temperature in the range of from about 50° to about 250° C. to form a polyhalo substituted tetrahydromethanoindan.

3. A process for the preparation of a polyhalo substituted tetrahydromethanoindan which comprises contacting a halogen with cyclopentadiene and subjecting the resultant 3,5-dihalocyclopentene to a non-catalytic Diels-Alder condensation with a hexahalocyclopentadiene at a temperature in the range of from about 50° to about 250° C. to form a polyhalo substituted tetrahydromethanoindan.

4. A process for the preparation of a polychloro substituted tetrahydromethanoindan which comprises contacting chlorine with cyclopentadiene and subjecting the resultant 3,5-dichlorocyclopentene to a non-catalytic Diels-Alder condensation with hexachlorocyclopentadiene at a temperature in the range of from about 50° to about 250° C. to form a polychloro substituted tetrahydromethanoindan.

5. A process for the preparation of a polybromo substituted tetrahydromethanoindan which comprises contacting bromine with cyclopentadiene and subjecting the resultant 3,5-dibromocyclopentene to a non-catalytic Diels-Alder condensation with hexabromocyclopentadiene at a temperature in the range of from about 50° to about 250° C. to form a polybromo substituted tetrahydromethanoindan.

6. A process for the preparation of 1,3,4,5,6,7,8,8-octachloro-3a,4,7,7a-tetrahydro-4,7,-methanoindan which comprises contacting chlorine with liquid cyclopentadiene to form 3,5-dichlorocyclopentene and non-catalytically condensing equimolecular proportions of said 3,5-dichlorocyclopentene and hexachlorocyclopentadiene in a Diels-Alder manner at a temperature in the range of from about 100° to about 200° C. to form 1,3,4,5,6,7,8,8-octachloro-3a,4,7,7a-tetrahydro-4,7-methanoindan.

7. A process for the preparation of 1,3,4,5,6,7,8,8-octabromo-3a,4,7,7a-tetrahydro-4,7-methanoindan which comprises contacting bromine with liquid cyclopentadiene to form 3,5-dibromocyclopentene and non-catalytically condensing equimolecular proportions of said 3,5-dibromocyclopentene and hexabromocyclopentadiene in a Diels-Alder manner at a temperature in the range of from about 100° to about 200° C. to form 1,3,4,5,6,7,8,8-octabromo-3a,4,7,7a-tetrahydro-4,7-methanoindan.

8. A process for the preparation of a polyhalo substituted tetrahydromethanoindan which comprises subjecting a 3,5-dihalocyclopentene and a hexachlorocyclopentadiene to a non-catalytic Diels-Alder condensation.

9. A process for the preparation of 1,3,4,5,6,7,8,8-octachloro-3a,4,7,7a-tetrahydro-4,7-methanoindan which comprises subjecting 3,5-dichlorocyclopentene and hexachlorocyclopentadiene to a non-catalytic Diels-Alder condensation.

References Cited in the file of this patent

UNITED STATES PATENTS 2,724,730    Johnson  ---------------- Nov. 22, 1955